United States Patent
Carney et al.

(10) Patent No.: US 6,508,313 B1
(45) Date of Patent: Jan. 21, 2003

(54) IMPACT TOOL BATTERY PACK WITH ACOUSTICALLY-TRIGGERED TIMED IMPACT SHUTOFF

(75) Inventors: Steven C. Carney, Prairie, WI (US); Matthew M. Crass, Prairie, WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/910,539

(22) Filed: Jul. 23, 2001

(51) Int. Cl.[7] ................................................ E21B 7/00
(52) U.S. Cl. .............................. 173/1; 173/217; 173/2; 173/171
(58) Field of Search ................................ 173/1, 2, 4, 20, 173/21, 93.5, 181, 217, 171; 310/47, 50

(56) References Cited

U.S. PATENT DOCUMENTS

| | | |
|---|---|---|
| 3,821,991 A | 7/1974 | Alexander |
| 3,982,419 A | 9/1976 | Boys |
| 4,060,137 A | 11/1977 | Bickford et al. |
| 5,154,242 A | 10/1992 | Soshin et al. |
| 5,170,358 A * | 12/1992 | Delio ............................ 173/2 |
| 5,250,891 A * | 10/1993 | Glasgow ..................... 320/140 |
| 5,277,261 A | 1/1994 | Sakoh |
| 5,289,885 A | 3/1994 | Sakoh |
| 5,293,156 A * | 3/1994 | Shoji et al. .......... 320/DIG. 21 |
| 5,366,026 A | 11/1994 | Maruyama et al. |
| 5,440,215 A * | 8/1995 | Gilmore ..................... 173/178 |
| 5,526,460 A * | 6/1996 | DeFrancesco et al. ...... 318/257 |
| 5,631,823 A | 5/1997 | Layer et al. |
| 5,657,417 A * | 8/1997 | Di Troia ..................... 173/148 |
| 5,715,894 A | 2/1998 | Maruyama et al. |
| 5,731,673 A * | 3/1998 | Gilmore ..................... 173/178 |
| 5,738,177 A * | 4/1998 | Schell et al. ................ 173/178 |
| 5,782,158 A | 7/1998 | Rothering |
| 5,874,681 A | 2/1999 | Habele |
| 6,055,484 A | 4/2000 | Lysaght |

* cited by examiner

Primary Examiner—Scott A. Smith
Assistant Examiner—Chukwurah Nathaniel
(74) Attorney, Agent, or Firm—Seyfarth Shaw

(57) ABSTRACT

An electrically powered impact tool has a removably mountable battery pack which includes an acoustic detection circuit for detecting sounds generated by the impact mechanism in use and, in response to such detection, starts an adjustable time period, at the end of which a relay is actuated for disconnecting the battery of the battery pack from the tool motor for a predetermined time period. This serves as a torque-limiting mechanism where the tool is a torque-applying tool. The time period is adjustable by a dial on the battery pack housing and the control circuitry may be selectively powered through a switch on the battery pack housing.

28 Claims, 2 Drawing Sheets

IMPACT TOOL BATTERY PACK WITH ACOUSTICALLY-TRIGGERED TIMED IMPACT SHUTOFF

BACKGROUND

The present invention relates to power tools and, in particular, to tools of the type powered by a detachable battery pack. The application relates in particular to impact tools, such as impact wrenches or other torque-applying impact tools.

It is known to provide powered torque-applying tools with means for controlling or limiting the torque applied by the tool to prevent over-torquing of fasteners or the like. These torque-limiting techniques typically utilize fairly complex and expensive mechanical, electromechanical or electronic devices for measuring applied torque and comparing it to a predetermined reference torque level. Such techniques are capable of providing fairly precise torque limiting or control.

However, it is frequently acceptable or desirable to provide a fairly rough or coarse torque limiting function in applications where precise torque control may not be necessary. It is known to provide impact tools with a built-in acoustic or vibrational detector, such as a microphone, to detect the sounds of impacts generated by the tool when torque starts to build up. One such device is disclosed, for example, in U.S. Pat. No. 5,277,261, which counts the number of impacts and disconnects power from the motor after a predetermined number of impacts has been counted. However, in order to utilize this feature, a person must purchase a tool of the type which incorporates the feature.

SUMMARY

This application is directed to electrically-powered devices and power packs therefor which avoid the disadvantages of prior devices while affording additional structural and operating advantages, An important aspect is the provision of a technique for simply and economically providing a pre-existing device with an acoustically triggered control function.

In connection with the foregoing aspect, another aspect is the provision of a combination of an electrically powered device and a removably connectable battery pack therefor, wherein the acoustically-triggered control function is incorporated in the battery pack.

Another aspect of the invention is the provision of a battery pack of the type set forth.

A still further aspect is the provision of a method for acoustically controlling shutoff of an electrically-powered impact tool.

Certain ones of these and other aspects may be attained by providing a battery pack for an electrically-powered device, the battery pack comprising: a housing; a battery disposed within the housing; a connection circuit for electrically connecting the battery to the associated device; and a control circuit in the housing connected to the connection circuit for controlling operation thereof, the control circuit including a detector for detecting vibrations generated by the associated device in use and producing a control signal, and a timer responsive to the control signal for initiating a predetermined time period, the control circuit being operable for disconnecting the connection circuit at the expiration of the time period.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
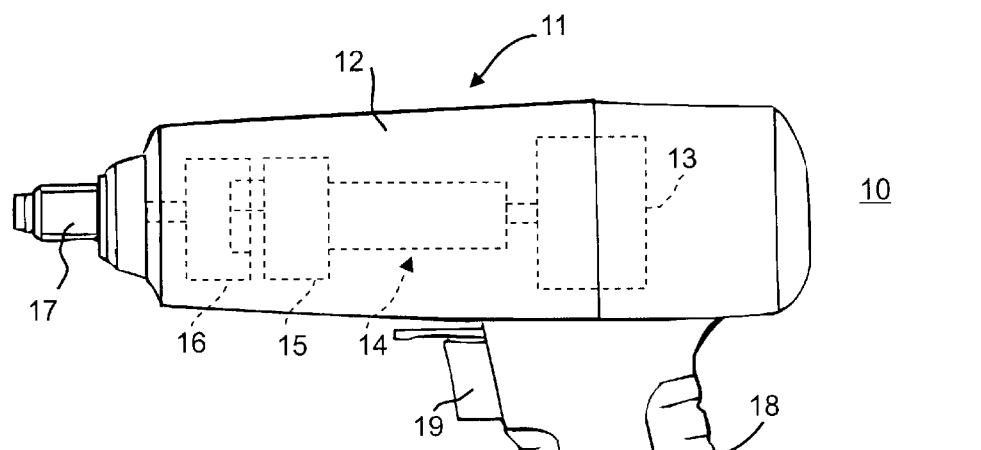
FIG. 1 is a side elevational view of an electrically-powered impact tool having mounted thereon a battery pack incorporating an acoustically-triggered control circuit.

Referring to FIG. 1, there is illustrated an impact tool, generally designated by the numeral 10, having a pistol-grip housing 11, including a barrel portion 12 in which are mounted an electric motor 13 and an impact mechanism 14 including a hammer 15 and an anvil 16, the latter being coupled to an output drive square 17, all in a known manner. The housing 11 includes a handle 18 on which is mounted a trigger 19 for controlling operation of the motor 13. A suitable tool, such as a socket or the like, may be mounted on the drive square 17 for interfacing with an associated fastener or the like to which torque is to be applied, again all in a known manner. The impact tool 10 is of a general type offered by a number of manufacturers, the construction and operation of which are well understood by those skilled in the art and, therefore, will not be further described herein.

Figure 2:
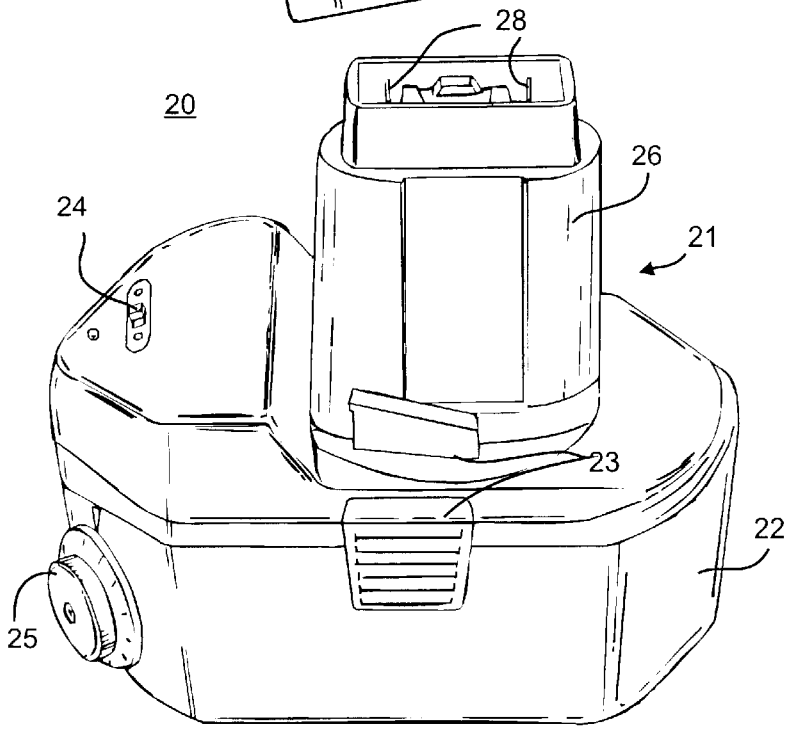
FIG. 2 is an enlarged, perspective view of the battery pack of FIG. 1.

The impact tool 10 is powered by a battery pack 20, which is detachably mountable on the handle 18 of the tool 10. Referring also to FIG. 2, the battery pack 20 has a housing 21 which includes an enlarged base 22 on which are mounted a pair of latch mechanisms 23 (one shown) adapted for cooperation with keeper structure (not shown) on the handle 18, in a known manner. Also mounted on the base 22 is an ON-OFF switch 24 and a control dial 25, the purposes of which will be explained more fully below. Projecting upwardly from the base 22 is a turret 26 which is dimensioned to be received in the hollow lower end of the handle 18 of the tool 10, and is provided with electrical terminals 28 for interface with mating terminals (not shown) in the handle 18 for electrically connecting the battery pack 20 to the motor 13 through the trigger mechanism 19. It will be appreciated that when the battery pack 20 is mounted in place on the handle 18, as illustrated in FIG. 1, the latch mechanisms 23 engage to retain the battery pack in place, the latch mechanisms 23 being manually operable for releasing the battery pack 20 to remove it.

Figure 3:
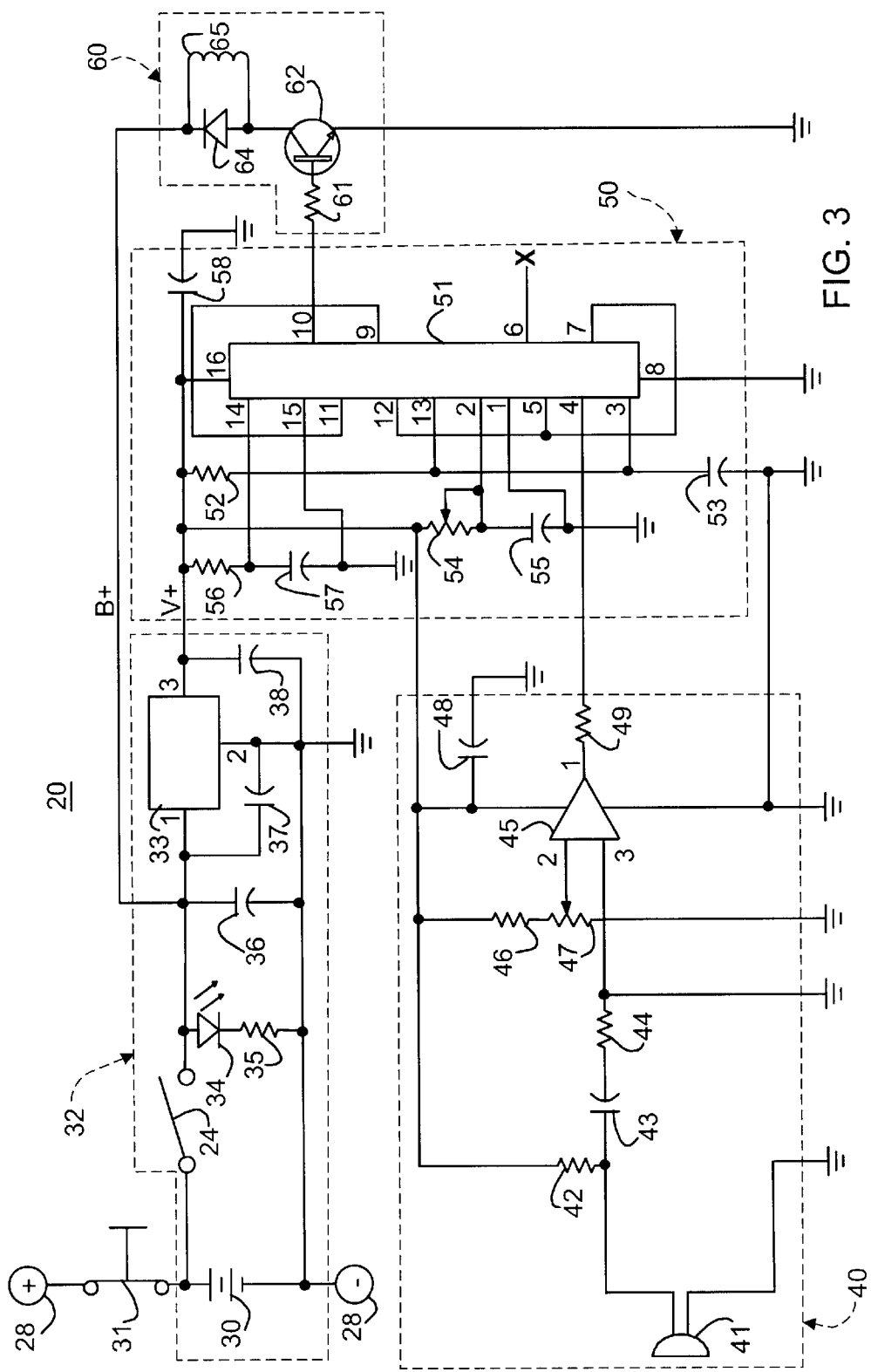
FIG. 3 is a schematic electrical circuit diagram of the circuitry of the battery pack of FIG. 2.

Referring now to FIG. 3, there is disclosed in the battery pack housing 21 a battery 30 and a control circuit. The battery 30 may be of the type suitable for operating the impact tool 10, such as a 12-volt Ni-Cad battery, although it will be appreciated that other battery types and battery voltages could be used, depending upon the particular tool being powered. The positive and negative terminals of the battery 30 are respectively connected to the terminals 28 on the turret 26, the positive battery terminal being connected to its associated terminal 28 through the normally-closed contacts 31 of a relay. The battery 30 forms part of power supply circuit 32 which includes an integrated-circuit voltage regulator 33, which may be a 78Lo5. More specifically, the positive and negative terminals of the battery 30 are respectively connected to pins 1 and 2 of the voltage regulator 33, the positive battery terminal being connected through the impact control ON-OFF switch 24. Connected across the input terminals of the voltage regulator 33 is the series combination of an LED 34 and a current-limiting resistor 35, the LED 34 being illuminated when the switch 24 is closed, signifying that the remainder of the battery pack circuitry is powered. Capacitors 36 and 37 are connected in parallel across the input terminals of the voltage regulator 33, while a capacitor 38 is connected across pin 2 and the output terminal at pin 3 of the voltage regulator 33. The voltage regulator receives the B+ voltage of the battery 30 at its input and generates at its output a V+ voltage, which may be 5VDC. Capacitors 37 and 38 quell oscillations within the voltage regulator 33, while capacitor 36 prevents damage to the voltage regulator.

Also disposed in the battery pack housing 21 is a trigger circuit 40 which, includes a vibrational or acoustic detector, such as a microphone 41, connected across the V+supply through a resistor 42. The microphone 41 converts vibrations applied to the battery pack 20 into electrical signals, the amplitude of which varies proportionally to the magnitude of the vibration. The microphone is connected through a coupling capacitor 43 and a resistor 44 to the signal input of an IC comparator 45, which maybe a TLC372, the reference input of which is connected to the wiper of a potentiometer 47 which is connected in series with a resistor 46 across the V+supply. A noise-filtering capacitor 48 is connected across the V+supply at the supply input terminals of the comparator 45. The output of the comparator 45 is connected through a resistor 49 to a timer circuit 50. The capacitor 43 decouples DC from the comparator 45. The potentiometer 47 is adjusted so that the comparator 45 responds to vibrations caused by impacting of the tool 10, but not vibrations of lesser magnitude.

The timer circuit 50 includes an integrated circuit dual timer 51, which may be an MC14538B. V+ supply voltage is provided to the dual timer 51 at pin 16, pin 8 being connected to ground. The output of the trigger circuit 40 at pin 1 of the comparator 45 is connected to the input of the dual timer 51 at pin 4 thereof. Pins 2–7 of the dual timer 51 are associated with a first timer for controlling impact duration, while pins 9–15 are associated with a second timer controlling the duration of battery disconnect. Connected in series across the V+ supply are a resistor 52 and a capacitor 53, the junction therebetween being connected to pins 3 and 13 of the dual timer 51. Also, connected in series across the V+ supply are a potentiometer 54 and a capacitor 55, the junction therebetween, as well as the wiper of the potentiometer 54, being connected to pin 2 of the dual timer 51, while pin 1 is connected to ground. Also connected in series across the V+ supply are a resistor 56 and a capacitor 57, pins 14 and 15 of the dual timer 51 being connected to opposite terminals of the capacitor 57. Pins 5, 7 and 12 of the dual timer 51 are connected together, as are pins 9 and 11. Pin 16 is connected to ground through a capacitor 58. Pin 6 is not connected and the output of the dual timer 51 is at pin 10.

In operation, a transition from low (zero volts) to high (5 volts) at the output of the comparator 45 starts the first timer, causing pin 7 of the dual timer 51 to go low. The duration of the first timer is determined by the value of the capacitor 55 and the adjusted resistance across the potentiometer 54, this adjustment being effected by the dial 25 (FIG. 2). The interconnection of pins 5 and 7 prevents any trigger signals at pin 4 from restarting the first timer while it is on. Pin 7 is connected to pin 12 so that when the first timer has timed out, a low-to-high transition at pin 12 will start the second timer. The duration of the second timer is determined by the values of the resistor 56 and the capacitor 57 and is typically set at about one second, a time sufficient for the operator to release the trigger 19. The interconnection of pins 9 and 11 prevents any trigger signals at pin 12 from restarting the second timer while it is on. The resistor 52 and the capacitor 53, connected to pins 3 and 13, serve as a power-on reset, insuring that when the switch 24 is closed, both timers remain off until an appropriate trigger signal is received from the trigger circuit 40.

Also disposed in the battery pack housing is a relay circuit 60. The output of the dual timer 51 at pin 10 is applied through a resistor 61 to the base of a transistor 62, the emitter of which is connected to ground and the collector of which is connected to the anode of a diode 64, the cathode of which is connected to the B+ supply. The coil 65 of the relay is connected across the diode 64. When pin 10 of the dual timer 51 is high, the transistor 62 is turned on, with resistor 61 providing current limiting. This allows current to flow through the coil 65 of the relay, opening the normally-closed contacts 31 to disconnect the battery 30 from the battery pack terminals 28. The diode 64 protects the circuitry from voltage spikes generated by the relay when the transistor 62 turns off. In operation, if timed impact control is desired, the impact control switch 24 is closed, powering the control circuitry of the battery pack 20, which will be indicated by illumination of the LED 34. The setting of the potentiometer 54 is controlled by the dial 25. Since the time versus torque equation varies with joint stiffness, friction and other variables, the appropriate time interval for impacting must be determined prior to first use. This could be done by setting the time interval to a minimum value, operating the tool 10, then measuring the torque applied to the associated fastener, and then increasing the time interval incrementally and repeating the process until the measured torque matches the desired value. Once determined, the same time interval setting can then be used to obtain the same torque for similar joints.

With the appropriate time interval is set, the tool 10 is utilized for torquing a fastener in a normal fashion. When the user pulls the trigger 19 the motor 13 is powered to start rotation of the output drive square 17. In low-torque conditions, when the fastener is spinning freely, the control circuitry of the battery pack 20 is inactive. Once the fastener is seated and torque begins to build up, the impact mechanism 14 begins to apply impact forces to the fastener, in a known manner, the vibrations associated with which are detected by the microphone 41, to start the first timer of the dual timer 51, which will typically be set for a few seconds, the normal impact time required to fully tightened a fastener. When that time period expires, an output is produced at pin 10 of the dual timer 51 for tripping the relay 65 and for starting the second timer. Energization of the relay opens the contacts 31 to disconnect the battery 30 from the motor 13, whereupon the user will release the trigger 19, since the limiting torque has been reached. At expiration of the second timer interval, the transistor 62 is turned off and the contacts 31 reclosed, preparing the apparatus for the next torquing cycle.

If timed impact control is not desired, the battery pack 20 can be used in its normal manner by simply leaving the switch 24 open, as signified by the LED 34 being off, in which case the tool 10 will operate normally. The battery pack would typically be used in this mode during a loosening of the fastener, where torque limiting is not desired.

While the present invention is disclosed as used in connection with a torque-applying impact tool, it will be appreciated that it could be utilized with other types of impact tools and, indeed, with electrically powered devices other than impact tools, wherever an onset of a predetermined condition is signified by generation of a detectable sound or vibration. Also, while a microphone is used in the illustrated embodiment for detection of the tool impacts, it will be appreciated that other types of vibration sensing devices could be used.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A battery pack for an electrically-powered device, the battery pack comprising:
    a housing;
    a battery disposed within the housing;
    a connection circuit for electrically connecting the battery to the associated device; and
    a control circuit in the housing connected to the connection circuit for controlling operation thereof,
    the control circuit including a detector for detecting vibrations generated by the associated device in use and producing a control signal, and
    a timer responsive to the control signal for initiating a predetermined time period,
    the control circuit being operable for disconnecting the connection circuit at the expiration of the time period.

2. The battery pack of claim 1, wherein the housing includes a plug portion receivable in a socket portion of the associated impact tool for mounting the battery pack on the tool.

3. The battery pack of claim 1, wherein the control circuit includes a relay having normally-closed contacts in the connection circuit.

4. The battery pack of claim 1, and further comprising an ON-OFF switch for selectively connecting the battery to the control circuit for powering same.

5. The battery pack of claim 4, and further comprising an indicator connected to the switch for indicating when the control circuit is powered.

6. The battery pack of claim 1, wherein the timer includes a circuit for selectively adjusting the length of a predetermined time period.

7. The battery pack of claim 1, wherein the timer includes circuitry for controlling the length of time that the connection circuit is disconnected at the expiration of the predetermined time period.

8. The battery pack of claim 1, wherein the detector is an acoustic detector.

9. The battery pack of claim 1, wherein the acoustic detector includes circuitry for selectively adjusting the sound level to which the detector will respond.

10. An electrically powered device comprising:
    an electric motor;
    an operating mechanism driven by the motor; and
    a battery pack having a battery and a connector adapted to be removably connected to the motor for powering same,
    the battery pack including a control circuit having a detector for detecting vibrations generated by the operating mechanism in use to produce a control signal, and
    a timer responsive to the control signal for initiating a predetermined time period,
    the control circuit being operable for disconnecting the battery from the connector at the expiration of the time period.

11. The device of claim 10, and further comprising a housing for the motor and impact mechanism, and structure for mounting the battery pack on the housing.

12. The device of claim 11, wherein the structure includes a turret portion on the battery pack and a socket portion in the housing for receiving the turret portion.

13. The device of claim 11, and further comprising latch mechanism for releasably retaining the battery pack on the housing.

14. The device of claim 10, and further comprising an ON-OFF switch for selectively connecting the battery to the control circuit for powering same.

15. The device of claim 10, wherein the timer includes a circuit for selectively adjusting the length of a predetermined time period.

16. The device of claim 10, wherein the device is an impact tool, the operating mechanism including an impact mechanism having a hammer and an anvil.

17. The device of claim 16, wherein the impact tool is a torque-applying tool.

18. A battery pack for an electrically-powered impact tool, the battery pack comprising:
    a housing;
    a battery disposed within the housing;
    means for connecting the battery to the associated tool;
    means for detecting vibrations caused by impacts generated by the associated tool and producing a control signal;

timing means responsive to the control signal for initiating a predetermined time period; and means for disconnecting the battery from the associated tool at the expiration of the time period.

19. The battery pack of claim 18, and further comprising means for selectively connecting the battery to the means for detecting and to the timing means and to the means for disconnecting.

20. The battery pack of claim 19, and further comprising means for indicating when the means for detecting and the timing means and the means for disconnecting are powered.

21. The battery pack of claim 18, wherein the timing means includes means for selectively adjusting the length of the predetermined time period.

22. The battery pack of claim 18, wherein the timing means includes means for determining the length of time that the battery remains disconnected from the associated tool at the expiration of the predetermined time period.

23. The battery pack of claim 18, wherein the means for detecting includes means for selectively adjusting the vibration level to which the means for detecting will respond.

24. A method for controlling operation of an electrically-powered impact tool, comprising:

providing a battery pack removably connectable to the tool for powering same, detecting sounds of impacts generated by the impact tool, beginning a predetermined time period in response to detection of the impact sounds, and automatically disconnecting the battery pack from the tool upon expiration of the time period.

25. The method of claim 24, and further comprising mounting the battery pack on the impact tool.

26. The method of claim 24, and further comprising selectively adjusting the length of the predetermined time period.

27. The method of claim 24, and further comprising determining the length of time that the battery pack remains disconnected from the tool upon expiration of the predetermined time period.

28. The method of claim 24, and further comprising adjusting the level of sound which can be detected in the detecting step.

\* \* \* \* \*